Feb. 19, 1963 P. P. CHILOVICH 3,077,863
SQUIRREL FEEDER
Filed March 2, 1962 2 Sheets-Sheet 1

INVENTOR.
PAUL P. CHILOVICH,
BY
McMorrow, Berman & Davidson
ATTORNEYS.

Feb. 19, 1963 P. P. CHILOVICH 3,077,863
SQUIRREL FEEDER
Filed March 2, 1962 2 Sheets-Sheet 2
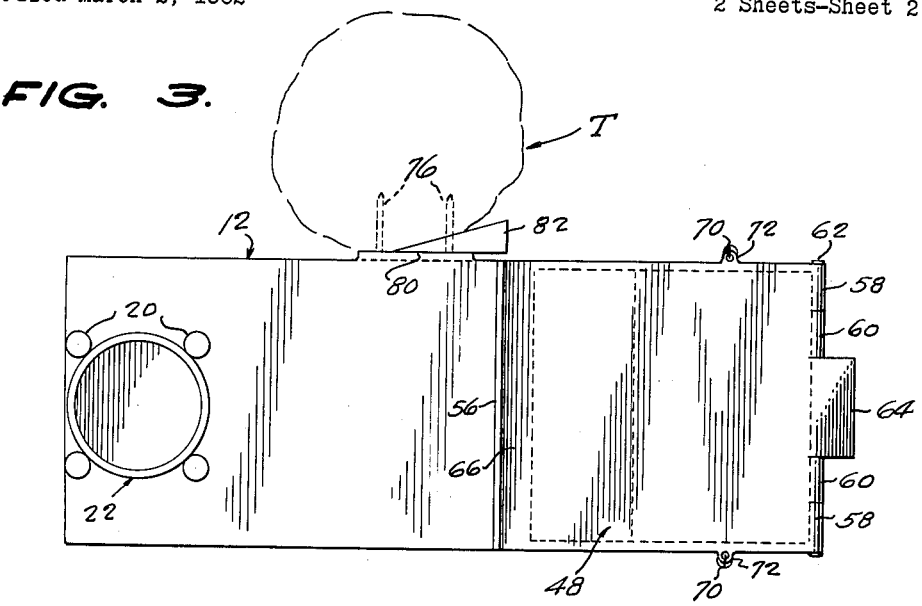
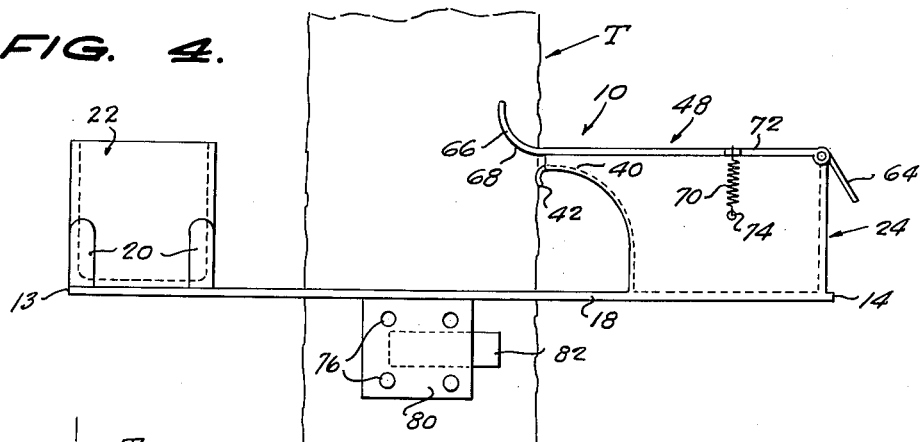
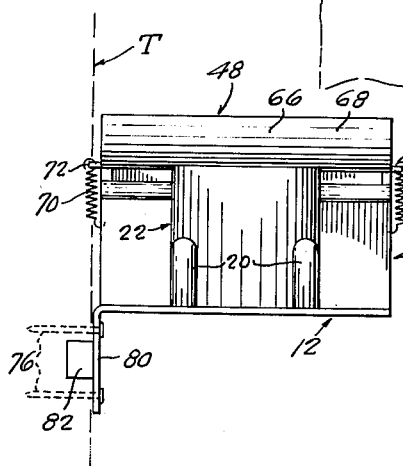
INVENTOR.
PAUL P. CHILOVICH,
BY
McMorrow, Berman & Davidson
ATTORNEYS.

United States Patent Office 3,077,863
Patented Feb. 19, 1963

3,077,863
SQUIRREL FEEDER
Paul P. Chilovich, 401 W. 1st South St.,
Mount Olive, Ill.
Filed Mar. 2, 1962, Ser. No. 176,965
7 Claims. (Cl. 119—62)

This invention relates to improvements in animal feeders, and more particularly to an improved feeder for squirrels.

The primary object of the invention is the provision of a generally superior, relatively inexpensive, and more practical device of the kind indicated, which protects feed therein against damage from the elements, including wind, and from being taken therefrom by birds, such as blue-jays, which are known to be purloiners of the type of food eaten by squirrels, such as acorns and ground-nuts.

Another object of the invention is the provision of a simpler and more rugged device of the character indicated above, which involves a feed box having a spring- and gravity-closed cover, the cover and the box having co-operating divergent portions which facilitate opening of the cover, by a squirrel, to gain access to the feed in the box, by inserting its head between the divergent portions and pushing upwardly on the cover, the divergent portions having curved surfaces which facilitate the action and prevent injury to the squirrel.

A further object of the invention is the provision of a device of the character indicated above, which includes a novel bracket for mounting the device on a support, such as a tree, the bracket also serving as a platform for a squirrel's approach to the feed box, and as a support for a drinking water container for use by squirrels.

Other important objects and advantageous features of the invention will be apparent from the following description and the accompanying drawings, wherein, for purposes of illustration only, a specific form of the invention is set forth in detail.

In the drawings:

FIGURE 3 is a top plan view of the device, showing the same mounted on a tree trunk;

FIGURE 4 is a side elevation of FIGURE 3; and

FIGURE 5 is a left-hand end elevation of FIGURE 4.

Figure 1:
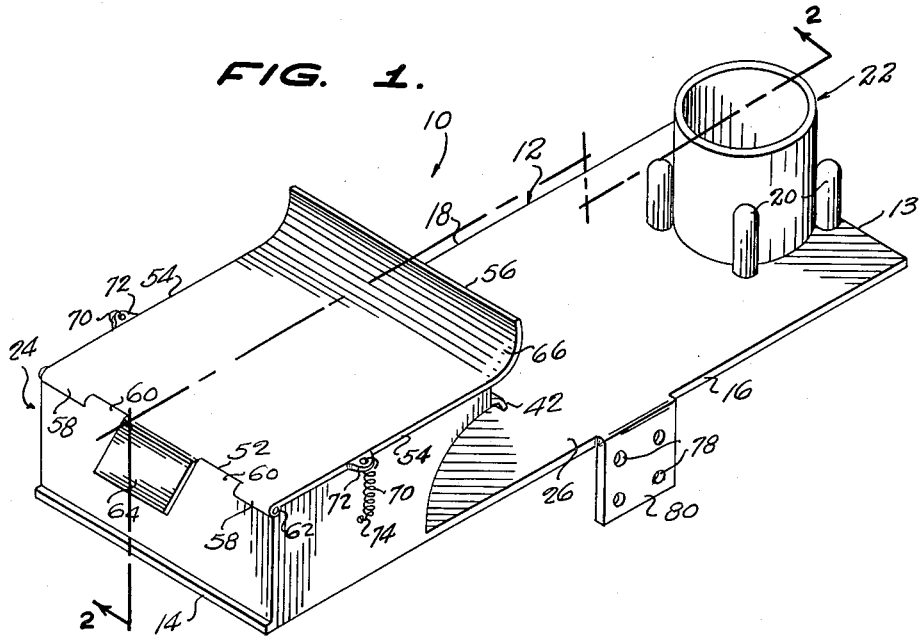
FIGURE 1 is a perspective view of a device of the present invention showing the cover of the feed box closed.

Referring in detail to the drawings, wherein like numerals designate like parts throughout the several views, the illustrated device, generally designated 10, is shown mounted on a side of a tree trunk T. The device 10 can be made of any suitable materials such as metal, plastics, or wood.

The device 10 comprises a bracket which is in the form of a preferably rectangular, horizontally elongated, horizontally disposed flat plate 12 having first and second ends 13 and 14, respectively, and inner and outer side edges 16 and 18, respectively. Centered on the bracket plate, at its first end 13, is a group of spaced upstanding pins 20, which serve to position a removable drinking water cup 22, on the plate.

A rectangular feed box 24 rises from the bracket plate 12, at the second end 14 thereof, is preferably as wide as the plate 12, and reaches to said second end 14 the feed box 24 being spaced from the drinking water cup 22 at a distance sufficient to enable a squirrel S to stand or sit on the intermediate portion 26 of the plate between the cup and the box. The intermediate portion 26 and the portion of the plate at the first end of the plate constitute a platform, on which a squirrel can walk to and fro between the cup and the box.

The second end portion 28 of the plate 12, forms the bottom wall for the feed box 24, from which rise a perpendicular outer end wall 30, perpendicular side walls 32, and an inner end wall 34. The inner end wall 34 consists of a perpendicular lower portion 36, and an arcuate upper portion 38, which has an upper surface 40 which curves upwardly and longitudinally inwardly, and the wall 34 terminates, at the upper end, in a downwardly curved lip 42, which has a protectively rounded bead 44 on its lower edge. The bottom wall of the feed box 24 is provided with perforations 46, which serve the dual purpose of providing ventilating air to feed F, within the box, and providing escape of odor from the feed, to attract squirrels to the device. It is preferable that the feed F consist of particles less than the normal size of acorns, such as broken acorns, corn, and the like, so that squirrels will eat on the platform of the device, rather than carry the feed away to be eaten elsewhere, where the feed is exposed to be stolen by such as blue-jays.

Figure 2:
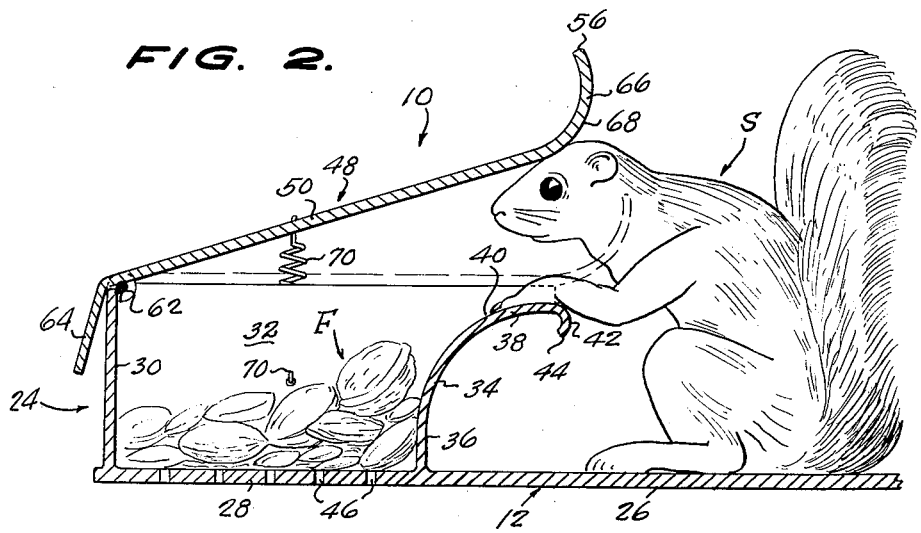
FIGURE 2 is a fragmentary vertical longitudinal sectional view, on an enlarged scale, taken on the line 2—2 of FIGURE 1, showing the cover of the feed box being opened by a squirrel standing upon the platform of the bracket.

The feed box 24 is normally closed by an imperforate cover 48, which, when closed, bears upon the upper edges of the outer end wall 30 and the side walls, and is slightly spaced above the arcuate upper portion 38 of the inner end wall 34, so that the feed box is then closed against the intrusion of wind, dust, rain, and snow, and birds. The arcuate upper end portion 38, as shown in FIGURES 2 and 4, is spaced downwardly from the upper edges of the feed box side walls 32. The cover 48 comprises a flat rectangular plate 50, at least as wide as the feed box, and somewhat longer than the feed box. The cover plate 50 has an outer end edge 52, side edges 54, and an inner end edge 56. Transversely spaced hinge barrels 58 are provided on the outer end edge 52, which are aligned with and abut the outer ends of transversely spaced hinge barrels 60, upstanding on the upper edge of the outer end wall 30 of the feed box, and a hinge pin 62 extends through the hinge barrels, so that the cover 48 is hinged on the outer end of the feed box, to open upwardly from its inner end.

A stop flange 64 is centered on the outer end edge of the cover plate 50, between the hinge barrels 60, and extends downwardly from the cover plate, at an obtuse angle, so as to have stop engagement with the outer end wall 30 of the feed box 24 and prevent the cover being opened beyond an acute angle to the horizontal plane of the top of the feed box, which would unduly expose the feed within the feed box to rain, wind, or snow.

The cover plate 50 has a transverse upwardly directed curved lip or arcuate inner end portion 66, which reaches to the inner end 56 of the cover plate, and has an inwardly and upwardly curved lower surface 68, which is spaced upwardly from and is divergent relative to the downwardly curved upper surface 40 of the inner end wall 34 of the feed box, so that, in the closed position of the cover 48, a squirrel can quickly learn to insert its nose and head between the divergent surfaces 40 and 68 and push the cover upwardly to open position, wherein the squirrel can reach into the feed box 24 and take feed F.

In order to assure against the cover 48 being opened by strong winds or by birds or other creatures not as strong as a squirrel, cover-closing spring means is provided, which augments the force of gravity for closing the cover. Such spring means preferably comprises vertical coil springs 70 which are secured to and stretched between lateral lugs 72 on the side edges 54 of the cover plate 50, and lower portions of the side walls 32 of the feed box 24. The lower ends of the springs 70 are preferably hooked through openings 74, provided in the side walls.

The device is adapted to be mounted to the side of a support such as a tree trunk T, by means of screws 76 extended openings 78 in a downwardly extending mounting lug 80, on the outer side edge 16 of the bracket plate 12, at a point intermediate the ends of the plate 12, and preferably at the center of gravity of the device. A wedge 82 is adapted to be wedged between the lug 80 and the side of the tree trunk T, as indicated in FIGURES 3 and 5, between screws 76, to eliminate rocking strain between the device and the tree trunk.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. An animal feeder comprising a horizontal bracket plate having first and second ends, and outer and inner side edges, an upstanding feed box on the bracket plate at its second end, said box having a perpendicular outer end wall and perpendicular side walls, said box having an inner end wall having at its upper end an upwardly and longitudinally inwardly curved convex upper surface, a cover plate having side edges, an outer end edge and an inner end edge, said cover plate being hinged at its outer end edge to the feed box in the region of the upper end of the outer end wall of the box, the cover being longer than the box and having an inner end portion extending longitudinally inwardly beyond the inner end wall of the box, said inner end portion of the cover plate having an inwardly and upwardly curved lower convex surface, said convex surfaces being in longitudinally inwardly divergent relationship.

2. An animal feeder comprising a horizontal bracket plate having first and second ends, and outer and inner side edges, an upstanding feed box on the bracket plate at its second end, said box having a perpendicular outer end wall and perpendicular side walls, said box having an inner end wall having at its upper end an upwardly and longitudinally inwardly curved convex upper surface, a cover plate having side edges, an outer end edge and an inner end edge, said cover plate being hinged at its outer end edge to the feed box in the region of the upper end of the outer end wall of the box, the cover being longer than the box and having an inner end portion extending longitudinally inwardly beyond the inner end wall of the box, said inner end portion of the cover plate having an inwardly and upwardly curved lower convex surface, said convex surfaces being in longitudinally inwardly diveregnt relationship, the inner end portion of the cover plate reaching longitudinally inwardly beyond the convex upper surface on the inner end wall of the feed box.

3. An animal feeder comprising a horizontal bracket plate having first and second ends, and outer and inner side edges, an upstanding feed box on the bracket plate at its second end, said box having a perpendicular outer end wall and perpendicular side walls, said box having an inner end wall having at its upper ends an upwardly and longitudinally inwardly curved convex upper surface, a cover plate having side edges, an outer end edge and an inner end edge, said cover plate being hinged at its outer end edge to the feed box in the region of the upper end of the outer end wall of the box, the cover being longer than the box and having an inner end portion extending longitudinally inwardly beyond the inner end wall of the box, said inner end portion of the cover plate having an inwardly and upwardly curved lower convex surface, said convex surfaces being in longitudinally inwardly divergent relationship, said cover plate having a downwardly angled stop flange at its outer end edge for stop engagement with the outer end wall of the feed box for limiting opening of the cover to a position wherein the cover in open position is in protective relation to the open top of the feed box.

4. An animal feeder comprising a horizontal bracket plate having first and second ends, and outer and inner side edges, an upstanding feed box on the bracket plate at its second end, said box having a perpendicular outer end wall and perpendicular side walls, said box having an inner end wall having at its upper end an upwardly and longitudinally inwardly curved convex upper surface, a cover plate having side edges, an outer end edge and an inner end edge, said cover plate being hinged at its outer end edge to the feed box in the region of the upper end of the outer end wall of the box, the cover being longer than the box and having an inner end portion extending longitudinally inwardly beyond the inner end wall of the box, said inner end portion of the cover plate having an inwardly and upwardly curved lower convex surface, said convex surfaces being in longitudinally inwardly divergent relationship, and spring means biasing the cover toward closed position.

5. An animal feeder comprising a horizontal bracket plate having first and second ends, and outer and inner side edges, an upstanding feed box on the bracket plate at its second end, said box having a perpendicular outer end wall and perpendicular side walls, said box having an inner end wall having at its upper end an upwardly and longitudinally inwardly curved convex upper surface, a cover plate having side edges, an outer end edge and an inner end edge, said cover plate being hinged at its outer end edge to the feed box in the region of the upper end of the outer end wall of the box, the cover being longer than the box and having an inner end portion extending longitudinally inwardly beyond the inner end wall of the box, said inner end portion of the cover plate having an inwardly and upwardly curved lower convex surface, said convex surfaces being in longitudinally inwardly divergent relationship, and spring means biasing the cover toward closed position, comprising external vertical coil springs secured to and stretched between the side edges of the cover plate and the feed box side walls.

6. An animal feeder comprising an elongated platform, a multi-walled feed box open at its top rising from said platform and located so that it occupies only a part of said platform with a wall adjacent the remainder part of said platform, the upper end of said wall being shaped to a downwardly-curved lip, a cover closing the open top and hinged to said box for movement between a closed position and a position permitting ingress to said box, said cover being longer than the open top of said box and having a portion projecting beyond said lip when in closed position, said projecting cover portion being shaped to an upwardly-directed curved lip, and spring means operatively connected to said cover and box for urging said cover toward closed position, said cover being operable from closed position to the open position against the action of said spring means upon application of a raising force to the upwardly-directed lip of said cover by the nose and head of a squirrel when said squirrel is seated in an upstanding position on the remainder part of said platform with its forelegs resting upon said downwardly-curved lip of said feed box.

7. The animal feeder according to claim 6 which includes in addition a stop flange depending from said cover on the hinged side thereof and engageable with an adjacent wall of said box when the cover has been moved to an open position to limit the extent of opening movement of said cover.

References Cited in the file of this patent
UNITED STATES PATENTS

| 948,794 | Peifer | Feb. 8, 1910 |
| 2,349,868 | Hyde | May 30, 1944 |